T. CASTOR.
Street-Cars.
No. 6,062. Reissued Sept. 22, 1874.
FIG. I.
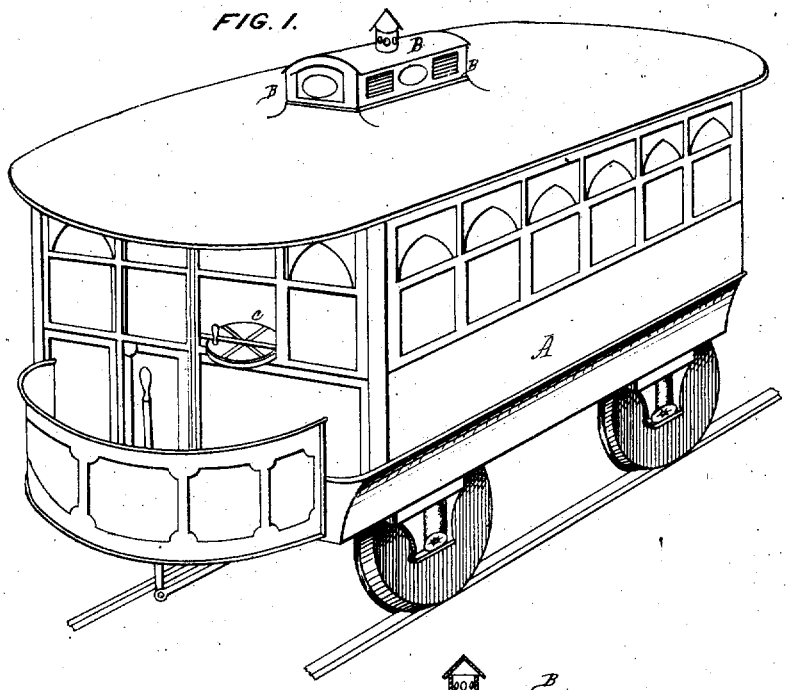
FIG. IV.
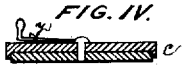
FIG. VI.
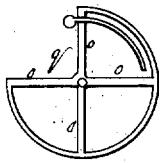
FIG. III.
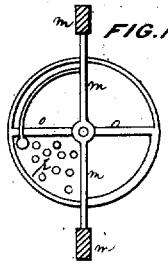
FIG. V.
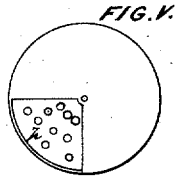
FIG. II.
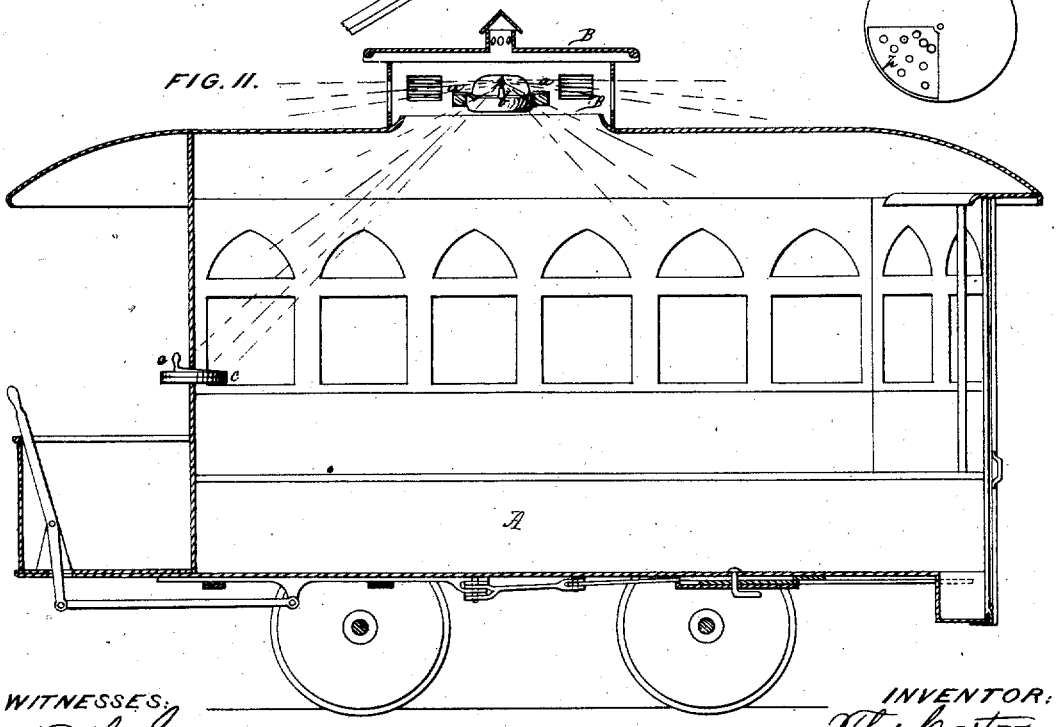
WITNESSES:
D. G. Stuart
J. Knight
INVENTOR:
Thos. Castor
per P. Hannay
Attorney.
THE GRAPHIC CO. PHOTO-LITH. 39 & 41 PARK PLACE, N.Y.

UNITED STATES PATENT OFFICE.

THOMAS CASTOR, OF PHILADELPHIA, PENNSYLVANIA, ASSIGNOR, BY MESNE ASSIGNMENTS, TO JOHN STEPHENSON, OF NEW YORK CITY.

IMPROVEMENT IN STREET-CARS.

Specification forming part of Letters Patent No. 32,681, dated July 2, 1861; reissue No. 6,062, dated September 22, 1874; application filed August 3, 1874.

DIVISION F.

*To all whom it may concern:*

Be it known that I, THOMAS CASTOR, of Philadelphia, in the State of Pennsylvania, have invented certain new and useful Improvements in Street-Cars, of which the following is a description, reference being had to the accompanying drawings, making part of this specification, in which—

Figure 1 represents a view in perspective of a street-car having my improvement applied thereto, and Fig. 2 a vertical longitudinal section of the same. Figs. 3, 4, 5, and 6 are detached views of the money or fare box, showing its details.

This division of my original patent relates to a new and improved mode of illuminating a car, and at the same time, and by the same means, lighting up the money-box, so as to enable the driver to scrutinize each fare as deposited by the passengers before depositing it in the general receiving-chamber.

My invention for this purpose consists in constructing the car with an elevation or dome in the roof, so as to be out of the way of the passengers; and in so arranging that dome that, when illuminated by a lamp suspended therein, it will cast its rays on the fare-box, and which, for this purpose, and for convenience of examination by the driver, is suitably arranged in the front end of the car, that he may examine each fare as deposited therein by the passengers, and that without leaving his post in front or withdrawing his attention from his other duties.

To enable others skilled in the art to make, construct, and use my improvement, I will now proceed to describe its parts in detail, omitting a particular description of such parts of a car as are non-essential to a full understanding of this branch of my invention.

The body A of the car may be of the usual construction, with the exception of the roof, which in this case is provided with an elevation or dome, B. Into this dome, by means of a ring or spider, *a*, is suspended or supported a lamp, *b*, by which the interior of the car is illuminated.

This lamp is so arranged, with respect to the dome and the front end of the car, as to light up the fare-box *c* also, as illustrated by penciled rays in Fig. 2.

For the purposes of this invention any known fare-box may be used, so long as the place where the fare is deposited is provided with an opening or space through which the rays of light can penetrate, in order to light up the fare for inspection by the driver, and which, at the same time, will enable him to collect the fare without the necessity of opening the door in the front end of the car for that purpose.

A suitable box is shown in Fig. 3, which represents a top view of a box with a revolving cover, and which in that view is represented as being turned round, so as to expose the money-drawer below.

Fig. 4 represents a cross-section of the same; and Fig. 5, a plan of the lower disk detached from the upper, while Fig. 6 shows a similar view of the upper disk.

One-quarter, *q*, of the upper disk is chambered, as shown in Fig. 6, while an equivalent section is cut out of the under one also, and a money-box, *p*, then fitted and secured to it below.

The box, when in condition or position to receive a fare, has its money-drawer *p* covered over by the upper disk; but when the latter is turned around sufficiently it brings the chambered quarter *q* over the money-box *p*, thus opening its mouth, to enable the fare to be deposited.

The upper side of the upper disk is provided with strips *o o*, which run at right angles across its top. The window-sash *m*, Fig. 3, fits closely down upon these strips, and thus prevents all drafts.

The fare being placed by the passengers in the coin-chambers, as shown in Fig. 6, the driver then turns the upper disk until it comes outside of the car, and then, after duly inspecting the money, he continues to turn the upper disk, so as to discharge downward the fares from the coin-chambers into the receptacle *p*.

The upper disk is fastened, when returned to its proper place, by a catch-spring, *y*, or other suitable device.

Having thus described my invention, what I claim as new, and desire to secure by Letters Patent, is—

The combination of a dome, B, a lamp therein, and a street-car body, provided with a fare-box, whereby the car and the box are lighted by the same lamp, substantially as set forth.

THOS. CASTOR.

Witnesses:
WM. HALL WAXLER,
DANIEL R. HART.